(12) United States Patent
Ghassemzadeh et al.

(10) Patent No.: US 9,203,493 B2
(45) Date of Patent: *Dec. 1, 2015

(54) TRANSMIT ANTENNA SUBSET SELECTION FOR RETRANSMISSION

(71) Applicant: AT&T INTELLECTUAL PROPERTY I, L.P., Atlanta, GA (US)

(72) Inventors: Saeed S. Ghassemzadeh, Andover, NJ (US); Robert Raymond Miller, II, Convent Station, NJ (US); Sang Joon Kim, Seoul (KR)

(73) Assignee: AT&T Intellectual Property I, L.P., Atlanta, GA (US)

( * ) Notice: Subject to any disclaimer, the term of this patent is extended or adjusted under 35 U.S.C. 154(b) by 71 days.

This patent is subject to a terminal disclaimer.

(21) Appl. No.: 13/974,530

(22) Filed: Aug. 23, 2013

(65) Prior Publication Data

US 2013/0343310 A1  Dec. 26, 2013

Related U.S. Application Data

(63) Continuation of application No. 13/321,637, filed as application No. PCT/US2010/036429 on Nov. 21, 2011, now Pat. No. 8,520,625.

(60) Provisional application No. 61/181,491, filed on May 27, 2009.

(51) Int. Cl.
  *H04B 7/06* (2006.01)
  *H04L 1/00* (2006.01)
  (Continued)

(52) U.S. Cl.
  CPC .............. *H04B 7/0602* (2013.01); *H04B 7/061* (2013.01); *H04B 7/0691* (2013.01); *H04L 1/0057* (2013.01); *H04L 1/0643* (2013.01); *H04L 1/1671* (2013.01)

(58) Field of Classification Search
  None
  See application file for complete search history.

(56) References Cited

U.S. PATENT DOCUMENTS

| | | | |
|---|---|---|---|
| 4,945,549 A | 7/1990 | Simon et al. | |
| 5,406,585 A | 4/1995 | Rohani et al. | |

(Continued)

FOREIGN PATENT DOCUMENTS

| | | |
|---|---|---|
| EP | 0740430 A2 | 10/1996 |
| EP | 1821440 A1 | 8/2007 |

(Continued)

OTHER PUBLICATIONS

Adachi, F. et al., "Performance Analysis of a Time Diversity ARQ in Land Mobile Radio," IEEE Trans. on Commun., vol. com-37, No. 2, pp. 177-183, Feb. 1989.

(Continued)

*Primary Examiner* — Dung B Huynh
(74) *Attorney, Agent, or Firm* — Abel Law Group, LLP

(57) ABSTRACT

A transmit switched antenna system utilizes one of several antennas selection protocols combined with feedback from a receiving device to take advantage of time and space transmission for the same information. A transmit device transmits first information over a first subset of a set of antennas and receives and ACK or NAK from the receiver along with a channel quality indicator. If a NAK is received, the transmitter selects a next antenna subset for transmission, based on the antenna selection protocol utilized. One protocol randomly selects the next subset and does not require the channel quality indicator. Another protocol determines the next antenna subset based on channel quality history and a third protocol selects the next antennas subset based on expectation of retransmissions for different subsets.

18 Claims, 7 Drawing Sheets

(51) Int. Cl.
 *H04L 1/06* (2006.01)
 *H04L 1/16* (2006.01)

(56) References Cited

U.S. PATENT DOCUMENTS

| | | | |
|---|---|---|---|
| 5,737,365 | A | 4/1998 | Gilbert et al. |
| 5,787,122 | A | 7/1998 | Suzuki |
| 5,949,799 | A | 9/1999 | Grivna et al. |
| 6,363,062 | B1 | 3/2002 | Aaronson et al. |
| 7,079,809 | B1 * | 7/2006 | Scherzer ............ 455/39 |
| 7,403,748 | B1 | 7/2008 | Keskitalo et al. |
| 7,466,695 | B2 | 12/2008 | Gerszberg et al. |
| 8,064,428 | B2 | 11/2011 | Bar-Ness et al. |
| 2001/0024964 | A1 | 9/2001 | Wang et al. |
| 2003/0012308 | A1 | 1/2003 | Sampath et al. |
| 2003/0096617 | A1 | 5/2003 | Miller, II et al. |
| 2005/0190849 | A1 * | 9/2005 | McNamara ............ 375/267 |
| 2005/0239510 | A1 * | 10/2005 | Cho et al. ............ 455/562.1 |
| 2006/0040707 | A1 * | 2/2006 | Kish et al. ............ 455/562.1 |
| 2006/0111054 | A1 * | 5/2006 | Pan et al. ............ 455/101 |
| 2007/0092020 | A1 * | 4/2007 | Seki ............ 375/267 |
| 2007/0190951 | A1 | 8/2007 | Lampinen et al. |
| 2007/0213062 | A1 | 9/2007 | Medlock et al. |
| 2007/0224953 | A1 * | 9/2007 | Nakagawa et al. ............ 455/140 |
| 2008/0051037 | A1 | 2/2008 | Molnar et al. |
| 2008/0056414 | A1 | 3/2008 | Kim et al. |
| 2009/0010353 | A1 | 1/2009 | She et al. |
| 2009/0028259 | A1 * | 1/2009 | Yu et al. ............ 375/260 |
| 2010/0180170 | A1 * | 7/2010 | Seo et al. ............ 714/748 |
| 2010/0246546 | A1 * | 9/2010 | Sung et al. ............ 370/338 |
| 2014/0011508 | A1 * | 1/2014 | Lee et al. ............ 455/452.1 |

FOREIGN PATENT DOCUMENTS

| | | |
|---|---|---|
| GB | 2411556 A | 8/2005 |
| WO | 2008023922 A1 | 2/2008 |

OTHER PUBLICATIONS

Bai, Dongwoon, et al., "Performance Analysis of a PASD Antenna System in Rayleigh Fading Channels," in Proc. IEEE Wireless Commun. and Networking Conf., pp. 1014-1019, Apr. 2008.

Benelli, Guiliano, "An ARQ Scheme with Memory and Soft Error Detectors," IEEE Trans. on Commun., vol. com-33, No. 3, pp. 285-288, Mar. 1985.

Chase, David, "Code Combining—a Maximum-Likelihood Decoding Approach for Combining an Arbitrary Number of Noisy Packets," in IEEE Trans. on Commun., vol. com-33, No. 5, pp. 385-393, May 1985.

Chen, Zhuo et al., "Performance of Alamouti Scheme with Transmit Antenna Selection," Electronics Letters, vol. 39, No. 23, 7 pp., IEEE, pp. 1135-1141, Mar. 2004.

Khayrallah, Ali, "Improved Time-Diversity Methods for Digital Cellular Telephone Receivers," Research Disclosure, Kenneth Mason Publications, Hampshire, GB, XP-000889044, No. 424, p. 1024, Aug. 1999.

Kim, Sang Joon et al., "Protocol Assisted-Transmit Antenna Selection Diversity (PA-TASD)," 20 pages, Mar. 4, 2009.

Lau, C. and Leung, C., "Performance Analysis of a Memory ARQ Scheme with Soft Decision Detectors," in IEEE Trans. on Commun., vol. com-34, No. 8, pp. 827-832, Aug. 1986.

Miller, R.R., "Improving Single Stream Device Performance Using Protocol Assisted Switched Diversity," Powerpoint presentation, IEEE 802.11n-07/2796r0 Standards, 14 pp., Nov. 2007.

Sindhu, Pradeep, "Retransmission Error Control with Memory," in IEEE Trans. on Commun., vol. com-25, No. 5, pp. 473-479, May 1977.

TSE, David and Viswanath, Pramod, "Fundamentals of Wireless Communication," Cambridge University Press: New York, 2005.

Yang, Liang and Qin, Jiayin, "Performance of Alamouti Scheme with Transmit Antenna Selection for M-Ray Signals," in IEEE Trans. on Wireless Commun., vol. 5, No. 12, pp. 3365-3369, Dec. 2006.

International Search Report and Written Opinion mailed Sep. 23, 2010 in PCT/US2010/036429, 10 pages.

* cited by examiner

TRANSMIT ANTENNA SUBSET SELECTION FOR RETRANSMISSION

CROSS-REFERENCE TO RELATED APPLICATION(S)

This application is a continuation of U.S. patent application Ser. No. 13/321,637 (now U.S. Pat. No. 8,520,625), filed Nov. 21, 2011, entitled "Transmit Antenna Subset Selection for Retransmission", which is a 371 of PCT/US2010/036429, filed May 27, 2010, which claims benefit of U.S. provisional application No. 61/181,491, filed May 27, 2009, entitled "Protocol Assisted Transmit Antenna Selection Diversity (PA-TASD)," which applications are hereby incorporated by reference in their entirety.

BACKGROUND

1. Field of the Invention

This application relates to wireless systems and more particular to wireless systems using closed loop transmit diversity.

2. Description of the Related Art

In recent years, multiple transmit antenna techniques have been widely studied to improve the capacity of wireless systems. In fact, current Wireless LAN (WLAN) standards (such as the IEEE 802.11n) deploy multiple antennas to transmit at either the base station and/or the client station. This approach increases the capacity of the wireless link and provides significant diversity gain. Streaming applications, such as Voice over Internet Protocol (VoIP) telephony, entertainment audio and video, and conferencing are natural extensions of modern Ethernet's ability to combine real-time and data traffic on a common system, thus lowering costs and providing inter-application service synergies. These real-time applications, however, are less forgiving of late packet delivery, either due to back-off resulting from system loading, or retransmission delays arising from contention, channel imperfection and consequent contention resolution (CR). Although the bounding of latency and jitter consistent with high-quality delivery of multimedia services can be achieved with wired LANs using switched-Ethernet or higher transmission rates, these are harder to apply with wireless Ethernets.

Multiple antenna systems have been broadly adopted in wireless communications to increase system capacity and improve performance. To achieve high spatial efficiency and reliability, transmit/receive diversity techniques have been considered. One such approach is Protocol Assisted Switched Diversity (PASD), which is an error control technique that utilizes Media Access Control (MAC) protocol elements and companion signal processing with multiple antennas and a single radio at the receiver to provide improved Quality of Service (QoS) performance with current IEEE 802.11 radio chipsets. The approach is described in U.S. Publication Number 20030096617, published May 22, 2003.

SUMMARY

In order to improve performance of WLAN and other wireless systems, a transmit switched antenna system is combined with one or more feedback protocol(s) to take advantage of time and space transmission for the same information. The performance may be further improved using space-time coding of transmitted information.

Accordingly, in one embodiment, a method is provided that selects a first subset of antennas from a set of antennas to transmit first information from a transmitting station to a receiving device. The transmitting station transmits the first information over the first subset of antennas and receives one of an acknowledge (ACK) and a no acknowledge (NACK) from the receiving device indicating whether the first information was successfully received. In response to receiving the NACK, the transmitting station selects a second subset of antennas from the set of antennas to retransmit the first information to the receiving device using a history of channel quality indicators received from the receiving device and retransmits the first information to the receiving device over the second subset of antennas.

In another embodiment, a method is provided that includes selecting a first subset of antennas from a set of antennas to transmit first information to a receiving device from a transmitting device. The first subset is two or more antennas. The transmitting station transmits the first information over the first subset of antennas and receives one of an acknowledge (ACK) and a no acknowledge (NACK) from the receiving device indicating whether the first information was successfully received. In response to receiving the NACK, the transmitting station randomly selects a second subset of antennas from the set of antennas to retransmit the first information to the receiving devices, the second subset being two or more antennas, and retransmits the first information to the receiving device over the second subset of antennas.

In another embodiment, a method is provided that includes selecting a first subset of antennas from a set of antennas for transmitting first information from a transmitting device to a receiving device, the first subset being two or more antennas. The transmitting device transmits the first information over the first subset of antennas and receives one of an acknowledge (ACK) and a no acknowledge (NACK) from the receiving device indicating whether the first information was successfully received. In response to receiving the NACK, the transmitting device compares an expectation of a number of transmissions between a first and at least a second policy and selects one of the first and second policies as a better policy, the better policy being evaluated according to which policy has an expected fewer number of transmissions. The transmitting station selects a second subset of the antennas associated with the better policy for retransmission of the first information and retransmits the first information to the receiving device over the second subset of antennas.

In still another embodiment, a transmitting station includes a set of antennas having a plurality of selectable subsets of antennas, each subset including at least two antennas. Control logic randomly selects a first subset of the set of antennas for transmitting first information to a receiving device. The transmitting station receives one of an acknowledge (ACK) and a no acknowledge (NACK) from the receiving device indicating whether the first information was successfully received. The control logic is responsive to receiving the NACK, to randomly select a second subset of the set of antennas from the set of antennas to retransmit the first information to the receiving device.

In still another embodiment of the invention, a transmitting station is provided that includes a set of antennas having a plurality of selectable subsets, each subset including at least two antennas. Control logic selects a first subset of the set of antennas for transmitting first information to a receiving device. The transmitting station is configured to receive one of an acknowledge (ACK) and a no acknowledge (NACK) from the receiving device indicating whether the first information was successfully received. The control logic is responsive to receiving the NACK, to select a second subset of the set of antennas to retransmit the first information to the receiving device using a history of channel quality indicators received from the receiving device.

In still another embodiment, a transmitting station includes a set of antennas having a plurality of selectable subsets, each subset including at least two antennas. Control logic selects a first subset of the set of antennas to transmit first information to a receiving device and the transmitting station is coupled to receive one of an acknowledge (ACK) and a no acknowledge (NACK) from the receiving device indicating whether the first information was successfully received. The control logic is responsive to receiving the NACK to compare an expectation of a number of transmissions between a first and at least a second policy and select one of the first and second policies as a better policy according to which policy has an expected fewer number of transmissions and to select a second subset of the antennas that is associated with the better policy for retransmission of the first information. In an embodiment, the first policy is a best known antenna subset and the second policy is a randomly selected antenna subset.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Embodiments of the invention discussed herein relate to improving the performance of digital radio signals with reduced complexity to transmitters and receivers, such as those commonly used with handheld communication devices using Multiple/Single Input-Single Output (i.e., MISO, and SISO communication systems) for wireless LAN and other wireless communication applications. An exemplary diversity system according to an embodiment of the invention involves use of a fusion of transmit switched antenna selection diversity with user selectable protocol-based transmission redundancy and space-time coding to improve the performance and capacity of wireless communication systems such as WLAN. In one embodiment disclosed herein, a transmitting station uses two independent transmit chains, with the antennas connected to form the transmit chains via an RF switch. In contrast to conventional switched-diversity operation, the switch is controlled by a feedback processing unit at the transmitter. The feedback processing unit receives messages from the receiver containing feedback information such as signal to noise ratio (SNR) and a channel quality indication. The feedback information itself may contain a current condition of maximal ratio combiner (MRC) and/or SNR comparator output at the receiver's station and is generated from a series of packet transmissions, each displaced in time. Each packet transmission may be encoded using a space-time block coder at the transmitter.

Figure 1:
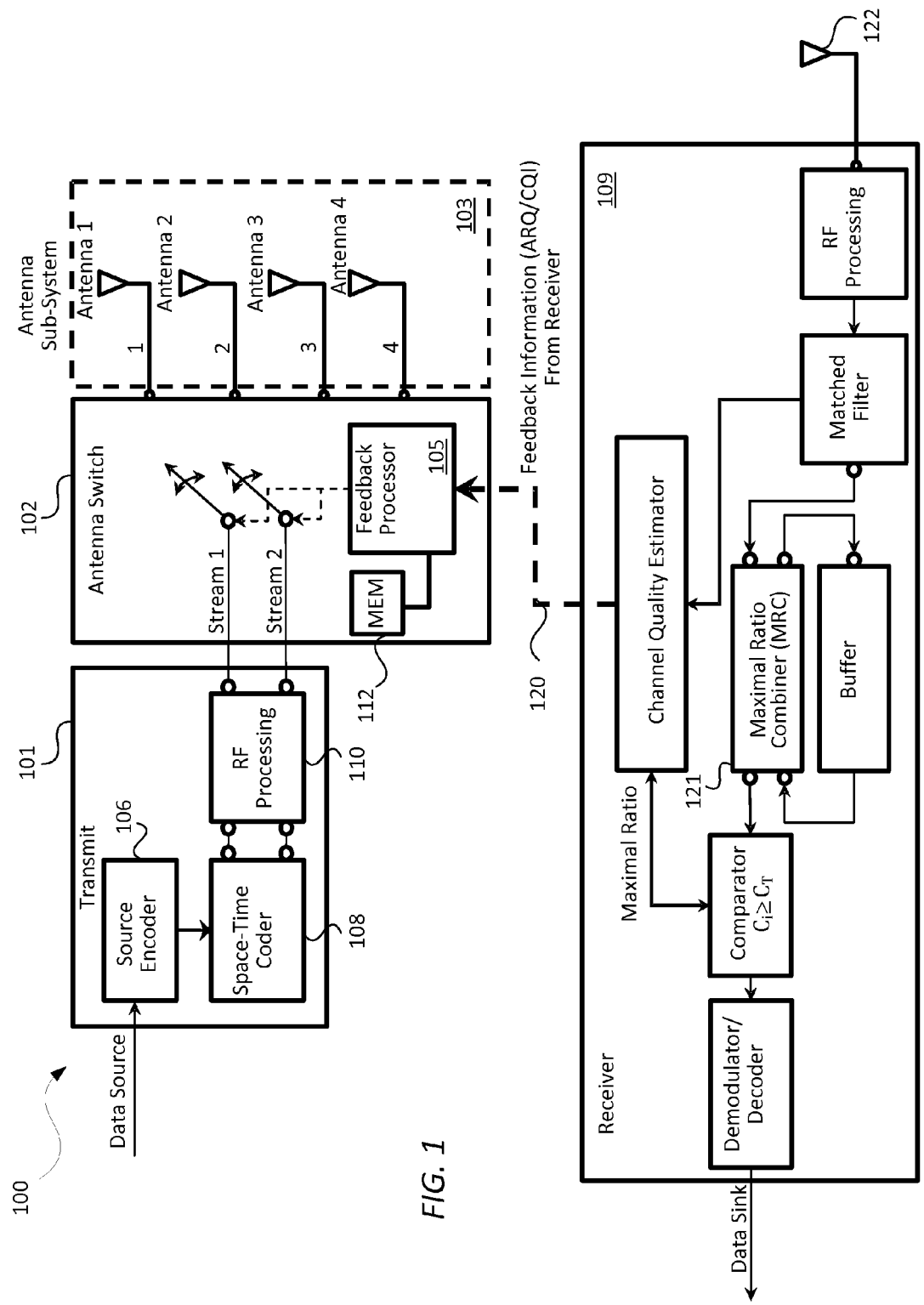
FIG. 1 shows a block diagram of a system according to an embodiment of the invention.

Referring to FIG. 1, illustrated is a block diagram of a system according to an embodiment of the invention. The embodiment shown employs Protocol Assisted Transmit Antenna Selection Diversity (PA-TASD) to achieve performance enhancement by providing a number of transmit antenna(s) N greater than the k number of transmit chains. In this case, the PA-TASD system can be described by (N,k; R,r), where N and k are the total number of antennas in the transmitting station and the number of antennas used at each transmission by the transmitting station, respectively. Similarly, R and r are the total number of antennas in the receiving station and the number of antennas used at each transmission by the receiving station, respectively. FIG. 1 illustrates a (4,2; 1,1) system architecture with Space-Time Block Coding and a maximal ratio combiner (MRC) decoder according to an embodiment of the invention. The notation (4,2; 1,1) indicates that the system has four transmit antennas and selects 2 of 4 for each transmission. The receiver has one receive antenna and uses that one antenna for each transmission. Thus, there are k=2 transmit chains and N=4 transmit antennas.

As shown in FIG. 1, the transmitting station 100 includes a transmit section 101 providing RF encoding functionality, an antenna switch portion 102, and an antenna subsystem 103. Data from a data source is provided to a source encoder 106 that in turn provides data to a space-time coder 108. The space-time coder provides the coded symbols to RF processing block 110 that supplies the RF signal to the antenna switch 102. In the exemplary embodiment shown in FIG. 1, feedback processor 105 provides the control functionality for the antenna switch 102. Software to help provide the control functionality may be stored in memory 112 along with other relevant control related information. The control functionality is typically provided as a combination of hardware and software.

In one particular embodiment, the transmitting station 100 and receiving station 109 first agree upon which TAS protocol to use for the remaining packet transmissions. The transmitting station 100 then transmits packet bursts from the selected antennas, which may increase the SNR or capacity of the receiving station 109. The receiving station 109 is responsible for sending feedback information 120, which may contain ACK/NACK, SNR, and SNR dB improvement or other appropriate channel quality indication (CQI) with respect to the last transmission, as described further herein. While shown separately for clarity, the feedback information from the receiver 109 may be provided from antenna 122 (note the transmit path through antenna 122 is omitted for simplicity). The transmitting station 100 then uses this information to determine whether to switch to another antenna subset in the antenna subsystem 103 and retransmit the same packet or frame again until the transmitting station receives an ACK from the receiving station or the maximum number of retries (if any maximum number is specified) is reached. Note that the term packet or frame or message are used interchangeably herein and are intended to refer to some number of bytes or other quantity of information transmitted as a group for which retry is appropriate according to the particular protocol being implemented.

In one particular embodiment, a transmitter of a mobile unit having more than two decorrelated antennas is enabled to operate with a fusion of transmit switched-antenna selection diversity and protocol-based redundancy using time-spaced transmission bursts, each containing the same message, to improve the uplink performance and capacity of the WLAN base station. These embodiments may include a notification capability that the base station or the mobile unit is capable of PA-TASD operations, including the number of antennas and receivers/transmitters available for operation.

Prior to describing the various Transmit Antenna Selection protocols according to various embodiments of the invention, consider an exemplary system model. Consider a MIMO system with $N_T := \{1, 2, \ldots, 1\}$ transmit and $N_R := \{1, 2, \ldots, R\}$ receive antenna sets in a quasi-static block fading channel. In $N_T$, transmitter T chooses $n_T$ ($\subseteq N_T$, $|n_T|=t$) antennas to transmit a block and likewise receiver R chooses $n_R$ ($\subseteq N_R$, $|n_R|=r$) antennas to receive the block. This antenna selection system is denoted as (T, t; R, r|M) MIMO system, where M ∈ {m, 0} is the indicator of the existence of receiving memory. For example, in the (4, 2; 1, 1|m) system, T has a total of 4 antennas and selects 2 of 4 for each transmission. R has only one antenna and R has a decoding memory. Channel information is assumed to be perfectly known at the receiver and partially known at the transmitter by feedback information from the receiver.

To send one block, first T selects $n_T^{(1)}$ antenna set and sends the block with $n_T^{(1)}$. Then, R receives the signal from $n_R^{(1)}$ and estimates channel quality $\gamma_1$ between $n_T^{(1)}$ and $n_R^{(1)}$. If $C(\gamma_1) < C_T$, where $C(\gamma_1 \ldots \gamma_l)$ is an accumulated channel quality function of $(\gamma_1 \ldots \gamma_l)$ and $C_T$ is the channel quality threshold for decoding signals, then R stores the received signals and transmits a NACK with CQI($=\gamma_1$). Otherwise, R transmits an ACK and the system moves to the next block. Unless T receives an ACK, it selects $n_T^{(l)}$ for the $l^{th}$ retransmission of the same block and sends it. After receiving $l^{th}$ trial, R estimates $\gamma_l$. If $C(\gamma_1 \ldots \gamma_l) < C_T$, T retransmits the same block, otherwise T stops the retransmission and moves onto the next block.

Consider a (T, 2; R, R|m) MIMO system, i.e., choose two transmit antennas in T antennas and use all receive antennas. Also, L is denoted as the total number of retransmissions for a block. Then, $$y^{(l)} = H^{(l)}x + w^{(l)} \quad (1)$$

for l∈[1,L], where $y^{(l)} \in \mathbb{C}^{R \times 1}$ is a received signal vector, $H^{(l)} \in \mathbb{C}^{R \times 2}$ is a complex channel gain matrix, $x \in \mathbb{C}^{2 \times 1}$ is a transmitted signal vector and $w^{(l)} \in \mathbb{C}^{R \times 1}$ is an independent and identically distributed (i.i.d.) circular symmetric complex Gaussian noise vector. Each element $h_{i,j}^{(l)}$ in $H^{(l)}$ follows CN(0, 1). Also, it can be assumed that $w_i^{(l)} \sim CN(0,1)$ and $E[|x_i|^2]=P/2$, where $w_i^{(l)} \in w^{(l)}$ and $x_i \in x$. To minimize decoding complexity, define $\gamma_l$ and $C(\bullet)$ as follows:

Channel quality of $l^{th}$ trial $\gamma_l$ and accumulated channel quality function $C(\gamma_1 \ldots \gamma_l)$ are defined as $\gamma_l$ are defined as $$\gamma_l := \frac{P}{2} Tr(H^{(l)} H^{(l)*}) = \frac{P}{2} \sum_{i=1}^{2} \sum_{j=1}^{R} |h_{i,j}^{(l)}|^2, \quad (2)$$

$$C(\gamma_1, \ldots, \gamma_l) := \sum_{i=1}^{l} \gamma_i = \frac{P}{2} \sum_{k=1}^{l} \sum_{i=1}^{2} \sum_{j=1}^{R} |h_{i,j}^{(k)}|^2. \quad (3)$$

An embodiment of the invention uses an Alamouti Space-Time Block Code (STBC) and a maximal ratio combining (MRC) decoder for the system architecture. With an Alamouti STBC and an MRC decoder, a sufficient statistic for each receiving antenna for each trial is:

$$u_i^{(l)} = \|h_i^{(l)}\|x + w_i \quad (4)$$

where $u_i^{(l)}$ is the sufficient statistic at $i^{th}$ receiving antenna in $l^{th}$ trial and $h_i^{(l)}$ is the $i^{th}$ row of $H^{(l)}$. Thus, MRC is applied in the set $\{u_i^{(l)}\}$:

$$u^{(l)} = \left( \sum_{i=1}^{R} \|h_i^{(l)}\|^2 \right)^{1/2} x + w \quad (5)$$

$$= \sqrt{\gamma_l} \cdot \sqrt{\frac{2}{P}} x + w \quad (6)$$

where $u^{(l)}$ is the output of the MRC decoder in $l^{th}$ trial. Then, the accumulated decision variable $U^{(l)}$ is updated from the previous value $U^{(l-1)}$ and current statistics $\gamma_l$ by the MRC:

$$U^{(l)} = \frac{\sqrt{C(\gamma_1, \ldots, \gamma_{l-1})} \cdot U^{(l-1)} + \sqrt{\gamma_l} \cdot u^{(l)}}{\sqrt{C(\gamma_1, \ldots, \gamma_l)}} \quad (7)$$

$$= \sqrt{C(\gamma_1, \ldots, \gamma_l)} \cdot \sqrt{\frac{2}{P}} x + w. \quad (8)$$

Since the decoding performance is directly related to $C(\bullet)$ in (8), it is sufficient to decide to continue retransmission or stop it and decode from $U^{(l)}$ only with the information $C(\bullet)$.

To select best channels for communication over the wireless link, the best antenna set $n_t^{(l)}$ should be selected, and that depends on the switching algorithms that are used for antenna selection. Various embodiments may utilize one or more of the switching approaches described herein. Three possible Transmit Antenna Selection (TAS) protocols are considered for use in selecting transmit antennas. The transmitter and receiver may negotiate as to which, if any, of the TAS protocols will be used.

A first of the possible TAS protocols is the Random Transmit Antennas Selection (R-TAS) protocol. In R-TAS, the transmitter T, also referred to herein as Tx) chooses the next antenna set randomly without using a channel quality indicator (CQI) supplied from the receiving station. Referring again to FIG. 1, in R-TAS, the feedback 120 provided by the receiving station 109 is an ACK or NAK. One aspect of one or more embodiments of the invention is that when enough packets (one or more) have been received successfully to decode the intended transmitted message, the receiving station sends a message to the transmitting station to acknowledge (ACK) correct reception of the message. When unsuccessfully receiving the message, a NAK is sent. The ACK message may be used by the transmitting station to terminate retransmission and move on to the next message.

In R-TAS the transmitter selects the next transmit antenna randomly and transmits the same packet to the receiver until it receives an acknowledgement (ACK) from the receiver or the maximum number of retries allowed is reached (if a maximum number is specified). Some embodiments may not specify a maximum number of retries. Referring again to FIG. 1, the receiving station 109 receives the frame, determines $C_i$ and if the measured channel quality indicator $C_i < C_T$, then the receiver transmits a no acknowledgement (NAK) back to the transmitting station 100. $C_T$ is the channel quality threshold for decoding signals and is based on the particular service associated with the transmission. Higher Quality of Service (QoS) requirements may require a higher $C_T$.

Figure 2:
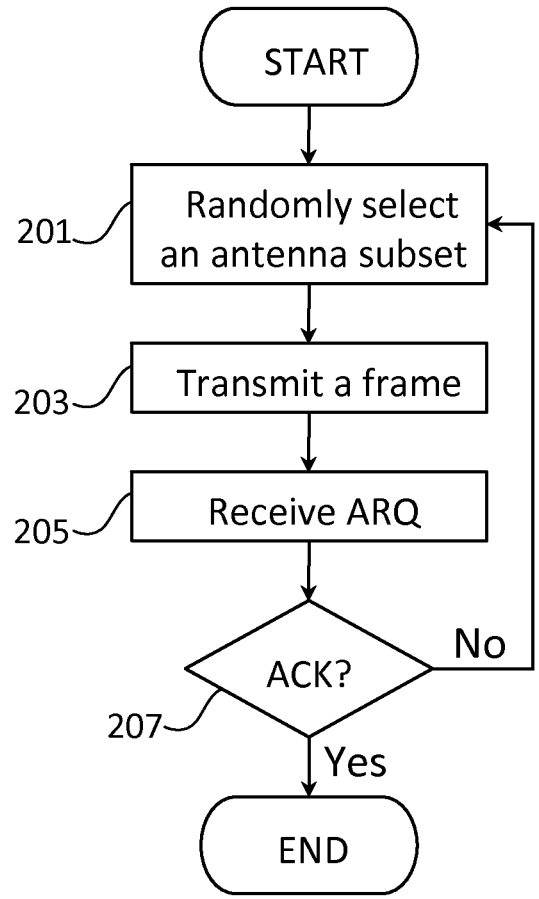
FIG. 2 illustrates operation of an exemplary embodiment of a flow diagram of an R-TAS system.

FIG. 2 is a simplified flow diagram of operation of an exemplary embodiment of an R-TAS system illustrated in FIG. 1. Assume that FIG. 2 illustrates a start-up condition for communications between the transmitter 100 and the receiver 109. At the beginning of transmitting, e.g., a frame of information, the control logic in the antenna switch 102 randomly selects at 201 a subset of the antennas shown in antenna sub-system 103. The transmitting station transmits the frame at 203 to the receiving station 109 over the randomly selected subset. The receiving station sends an Automatic Repeat reQuest (ARQ) to the transmitting station after receipt of the frame based on comparison of the measured channel quality indicator $C_i$ and the threshold channel quality indicator $C_T$. At 205, the transmitting station receives the ARQ. If the ARQ was an acknowledge (ACK) indicating successful receipt of the frame, the process is complete. However, if the ARQ was a NAK indicating unsuccessful receipt of the frame, then the flow returns to 201 and a random subset of the antennas is again selected and the same frame is transmitted to the receiving station 109. This process repeats until the limit of retries has been reached (if any), or an ACK is received.

Figure 3:
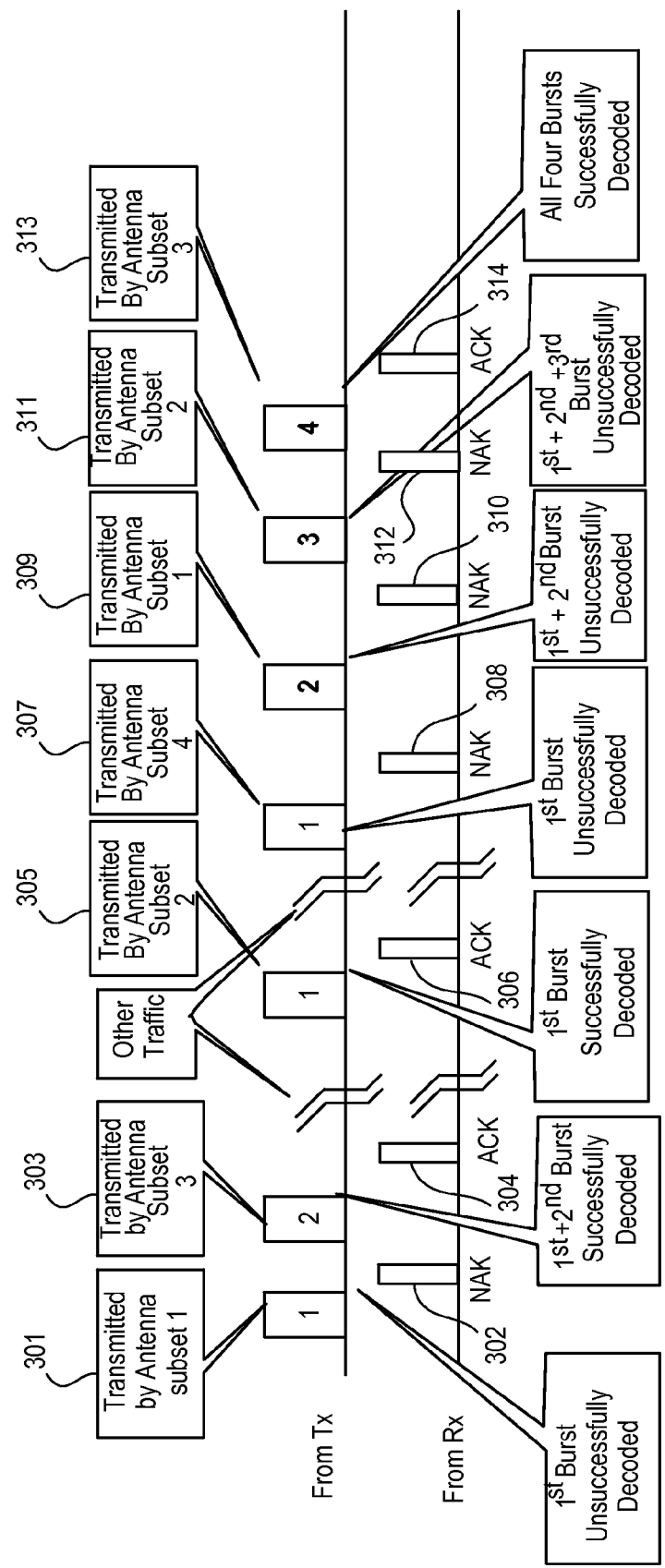
FIG. 3 illustrates an exemplary R-TAS transmission scenario.

FIG. 3 illustrates an exemplary R-TAS transmission scenario. At 301, randomly selected antenna subset 1 at the transmitting station (Tx) transmits a frame of information to the receiving station (Rx). At 302, after unsuccessfully decoding the first transmission, the Rx sends a NAK at 302. At 303, the Tx randomly selects antenna subset 3 and retransmits the frame (second transmission). The second transmission of the frame is successfully received by the Rx who sends the ACK at 304. After other traffic, the Tx randomly selects antenna subset 2 and the first transmission is successfully received by the Rx who responds with an ACK at 306.

At 307, the transmitting station randomly selects antenna subset 4 and transmits a frame of information to the receiving station (Rx). At 308, after unsuccessfully decoding the first transmission, the Rx sends a NAK. At 309, the Tx randomly selects antenna subset 1 and retransmits the frame (second transmission). At 310, after unsuccessfully decoding the first and second transmissions, the Rx sends a NAK. At 311, the Tx randomly selects antenna subset 2 and retransmits the frame (third transmission). At 312, after unsuccessfully decoding the first, second, and third transmissions, the Rx sends a NAK. Finally, at 313, the Tx randomly selects antennas subset 3 and retransmits the frame (fourth transmission). At 314, after successfully decoding the fourth transmission, typically exploiting the history of the other transmissions, the Rx sends an ACK.

Assuming the channel is varying independently between different frames, the R-TAS protocol is a good choice since it has a very low implementation complexity and CQI becomes useless in a time-uncorrelated channel.

Figure 4:
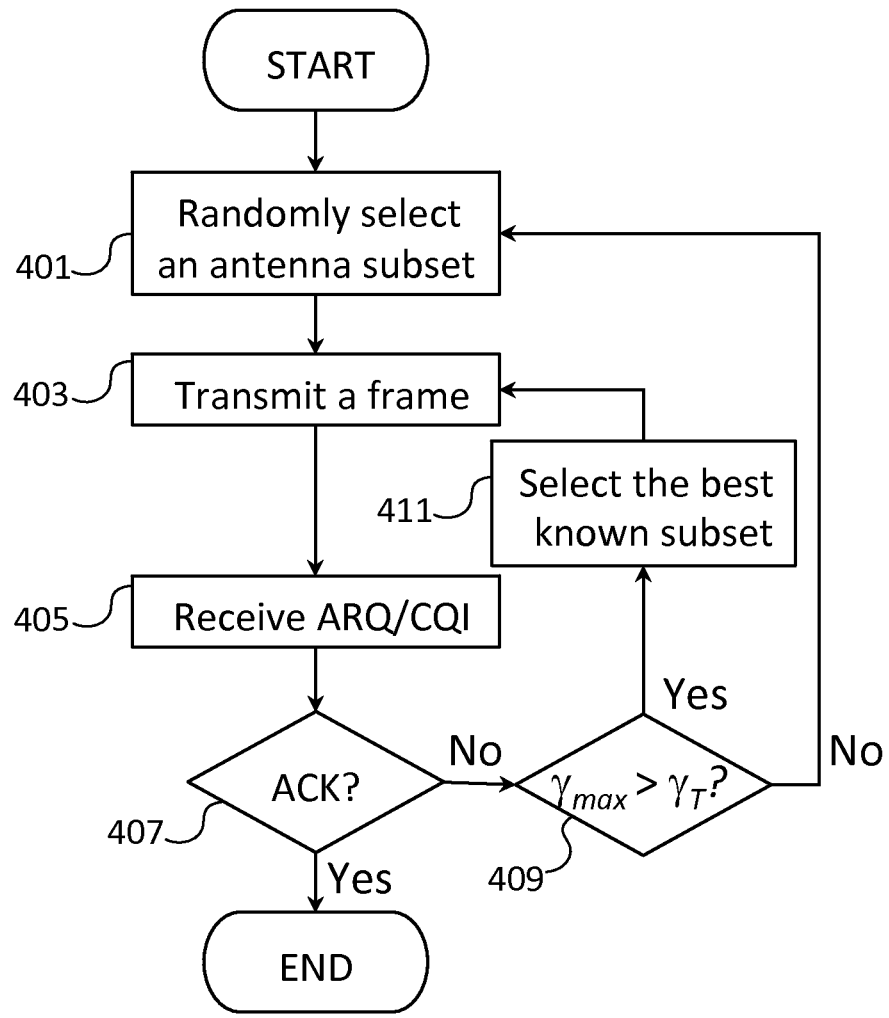
FIG. 4 illustrates an exemplary flow diagram for the T-TAS protocol according to an embodiment of the invention.

A second protocol according to an embodiment of the invention is Threshold-Transmit Antenna Selection (T-TAS). The T-TAS protocol uses a predetermined channel quality threshold level. If any of the transmit antenna subsets achieve a higher channel quality than the threshold channel quality, the transmitter uses that antenna subset for the next retransmission. Otherwise, the transmitter selects the next antenna subset randomly and receives additional channel quality information from feedback information. FIG. 4 illustrates an exemplary flow diagram for the T-TAS protocol. To start, two channel quality thresholds, $\gamma_T$ and $C_T$ are chosen. $C_T$ is the channel quality threshold for decoding signals and may be based on the particular service associated with the transmission. Higher Quality of Service (QoS) requirements may require a higher $C_T$. Both $\gamma_T$ and $C_T$ thresholds are typically associated with a signal to noise ratio (SNR). Assuming the two channel quality thresholds $\gamma_T$ and $C_T$ are known, to start, the transmitter selects an antenna subset randomly in 401 and transmits a frame in 403. The receiver receives the frame, measures $\gamma_i$ and $C_i$ and if the measured channel quality indicator $C_i<C_T$, then the receiver transmits a NAK and $\gamma_i$. Otherwise, the receiver transmits an ACK and $\gamma_i$ if $C_i>C_T$. In 405, the transmitter receives the ARQ/CQI (ACK/NAK and $\gamma_i$). In 407, if an ACK is received by the transmitter, the process ends. Note that FIG. 4 assumes an initial transmission between the transmitter and the receiver. Before describing the process if a NAK is received, some additional details are provided.

The threshold value $\gamma_T$ provides an acceptable channel quality threshold level. The transmitter uses $\gamma_i$ along with the ACK/NAK supplied by the receiver to decide what antennas to use for the next transmission. The transmitter stores a history of recent $\gamma_i$s. Referring again to FIG. 4, if in 407 the transmitter receives a NAK, then the transmitter compares $\gamma_T$ to $\gamma_{max}$ in 409, where $\gamma_{max}$ is the channel quality of the best known antenna subset of recent $\gamma_i$s. $\gamma_{max}=\max(\gamma_1, \ldots \gamma_L)$. If the answer to 409 is yes ($\gamma_{max}>\gamma_T$), then the best known subset, associated with $\gamma_{max}$, is selected for the next transmission in 411 and the flow returns to 403 to transmit the frame. Note that because $\gamma_i$ may be denominated in dB improvement, the best subset of antennas may be determined by evaluating the set ($\gamma_1, \ldots \gamma_L$) for the antenna subset with the best transmission, not simply the largest valued $\gamma_i$. Note that in one embodiment, the set of $\gamma_i$s runs from 1 to L, where L is the number of retries allowed. If the answer to 409 is NO ($\gamma_{max}<\gamma_T$), then the transmitter returns to 401 and randomly selects another antenna subset for the next retransmission.

Figure 5:
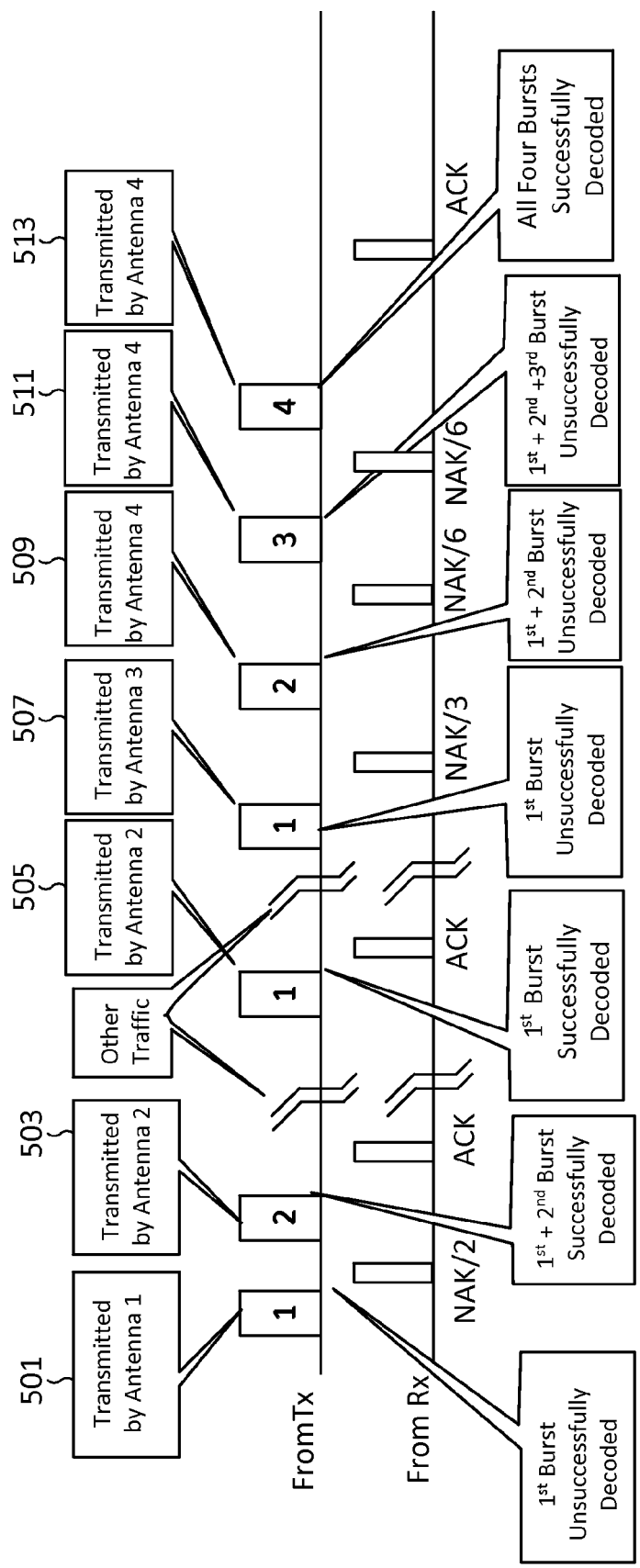
FIG. 5 illustrates an exemplary T-TAS transmission scenario.

FIG. 5 illustrates an exemplary T-TAS transmission scenario showing the number of times a packet was transmitted. Three different scenarios are shown in FIG. 5 and it can be assumed that the antenna used for the first packet transmitted in each scenario was randomly selected. It depends, of course, on the traffic immediately preceding the transmission. For example, under certain circumstances, the transmitter may initially use the antenna that last successfully transmitted to the receiver to send the next frame. At 501, a first burst is transmitted by antenna subset 1, which is unsuccessfully decoded and results in a NAK/2 ($\gamma_i=2$). Note that $\gamma_T=5$ in the exemplary transmission sequence. The next antenna subset (2) is randomly selected and retransmits the burst at 503. The burst is successfully decoded and results in an ACK.

The second scenario in FIG. 5 is a transmission by antenna subset 2 at 505, which is successfully decoded and results in an ACK. The antenna subset 2 may be randomly selected or may be based on the successful transmission in 503. Obviously, the time between transmission at 503 and 505 may affect the benefits, if any, of using antenna subset 2 again.

The third scenario begins at 507 with a transmission by subset 3. The receiver returns a NAK/3 ($\gamma_i=3$). At 509, randomly selected antenna subset 4 transmits a second burst, which is unsuccessfully decoded and results in a NAK/6. Because $\gamma=6>\gamma_T$, $\gamma_{MAX}$ is selected, which is antenna subset 4. Antenna subset 4 transmits at 511, resulting in an unsuccessful decode, and the receiver returns a NAK/6. Again, because $\gamma_i=6>\gamma_T$, $\gamma_{MAX}$ is selected, which is antenna subset 4. Antenna subset 4 transmits at 513 resulting in a successful decode and an ACK.

Note that the selection of $\gamma_T$ may be based on QoS and other factors associated with a particular service being provided. If $\gamma_T$ is set too high, that can result in a large number of retransmissions with randomly selected antennas subsets. If $\gamma_T$ is set too low, that can result in a large number of retransmissions with a current $\gamma_{MAX}$. In the T-TAS protocol, the average number of transmissions E[L] is a function of threshold level $\gamma_T$. With high $\gamma_T$, searching for an appropriate transmit antenna subset is difficult, i.e., $E[L_S]$ is large where $L_S$ is the number of transmissions until finding a proper subset. However, after finding a proper subset, the remaining number of transmissions $L_T$ is small. Similarly, if a relatively small $\gamma_T$ is taken, then $E[L_S]$ decreases, while $E[L_T]$ increases. Therefore, one approach is to adjust $\gamma_T$ to reduce $E[L]$ for a given channel characteristic.

A third protocol according to an embodiment of the invention is the Minimum Number of Transmissions-Transmit Antenna Selection (MNT-TAS) protocol. The transmitter determines whether to use the best known antenna set for the next transmission or to select a new antenna set by random choice. However, MNT-TAS protocol does not have a predetermined threshold level. Instead, the transmitter evaluates the expectation of the number of remaining transmissions of two policies and takes the better policy. The transmitter determines whether it will use the best known antenna subsets for the next transmission or find a new antenna set by random choice. The transmitter evaluates the expectation of the number of remaining transmissions of two policies and takes the better policy.

In the MNT-TAS protocol, the transmitter compares the expectation of number of transmissions $E[L]$ at each trial between two policies, e.g., one policy using the best known antenna subset and a second policy that tries a new subset. $E[L]$ is a function of current maximum channel quality and remaining amount of channel quality is denoted, and $$\mathcal{L}(\gamma_l^{max}, C_l^{rem}) = \min\left\{\left\lceil \frac{C_l^{rem}}{\gamma_l^{max}} \right\rceil, E_\gamma[\mathcal{L}(\max\{\gamma_l^{max}, \gamma\}, C_l^{rem} - \gamma)] + 1\right\}. \quad (9)$$

If the transmitter decides to use the best known subset with channel quality for $\gamma_l^{max}$ for $(l+1)^{th}$ trial, then it also uses $\gamma_l^{max}$ for all $k \in [l+2, L]$. By induction, it can be shown that if the transmitter decides to use the best known set, then it is optimal to use the set until the end of transmissions. To determine the optimal policy, it is necessary to estimate $E_\gamma[\mathcal{L}(\bullet)]$. If the probability density function (p.d.f.) of $\gamma$ is denoted as $p_\gamma(\gamma)$, then:

$$E_\gamma[\mathcal{L}(\max\{\gamma_l^{max}, \gamma\}, C_l^{rem} - \gamma)] = \quad (10)$$
$$\int_0^{\gamma_l^{max}} \mathcal{L}(\gamma_l^{max}, C_l^{rem} - \gamma) p_\gamma(\gamma) d\gamma + \int_{\gamma_l^{max}}^{\infty} \mathcal{L}(\gamma, C_l^{rem} - \gamma) p_\gamma(\gamma) d\gamma.$$

It is difficult to find a closed form of $E_\gamma[\mathcal{L}(\bullet)]$ because $\mathcal{L}(\bullet)$ is defined by a recurrence relation and the relation is expressed in the continuous domain in (10). Instead of the exact expression, the following sub-optimal determine rule can be used:

$$\mathcal{L}'(\gamma_l^{max}, C_l^{rem}) = \quad (11)$$
$$\begin{cases} 1, & 0 < C_l^{rem} \le \gamma_l^{max} \\ \min\{\tilde{\mathcal{L}}(\gamma_l^{max}, C_l^{rem}), \\ E_\gamma[\tilde{\mathcal{L}}(\max\{\gamma_l^{max}, \gamma\}, C_l^{rem} - \gamma)] + 1\}, & \text{otherwise} \end{cases}$$

where $$\tilde{\mathcal{L}}(\gamma, C) := \left\lceil \frac{C}{\gamma} \right\rceil.$$

Note mat since $\mathcal{L} \le \tilde{\mathcal{L}}$ $\mathcal{L}$ is also less than or equal to $\mathcal{L}$ from (9) and (11).

Figure 6:
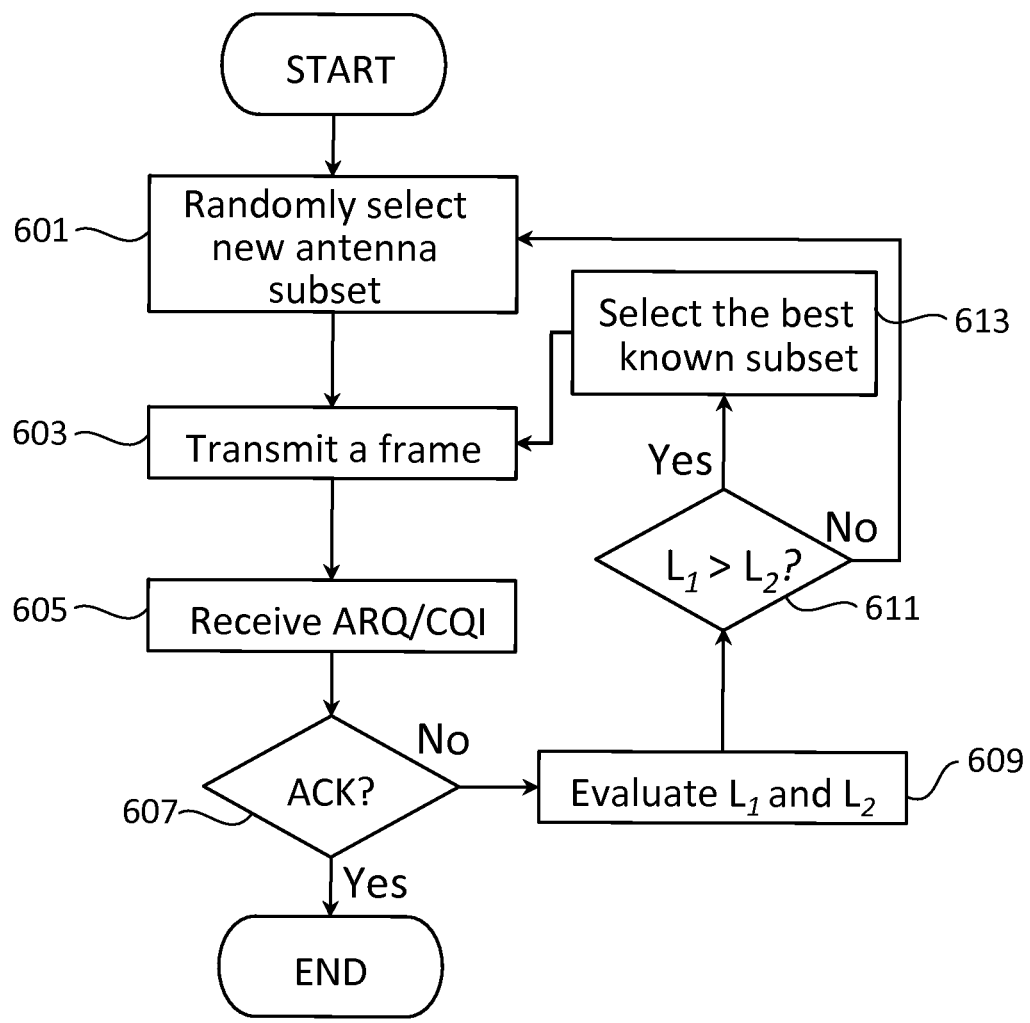
FIG. 6 illustrates an exemplary flow diagram for the MNT-TAS protocol according to an embodiment of the invention.

FIG. 6 illustrates an exemplary flow diagram for the MNT-TAS protocol. In FIG. 6, $L_1$ is the expectation of the remaining number of transmissions with the best known set. $L_2$ is the expectation of the remaining number of transmission by trying a new set. In 601, a new antenna subset is randomly selected. At 603, a frame is transmitted over the randomly selected subset. The receiver receives the frame, measures $\gamma_i$ and $C_i$ and if the measured channel quality indicator $C_i < C_T$, then the receiver transmits a NAK and $\gamma_i$. Otherwise, the receiver transmits an ACK and $\gamma_i$ if $C_i > C_T$. In 605, the transmitter receives the ARQ/CQI (ACK/NAK and $\gamma_i$). In 607, if an ACK is received by the transmitter, the process ends.

If a NAK is received in 607, the transmitter evaluates $L_1$, (the expectation of the remaining number of transmissions with the best known subset) and $L_2$, the expectation of the remaining number of transmissions by trying a new subset in 609. If $L_1 > L_2$ in 611, the transmitter selects the best known set associated with L1 for retransmission of the frame in 613. The process repeats until an ACK is received or the limit (if any) of retransmissions is reached. If the answer is NO in 611, then the flow returns to 601 to randomly select a new antenna subset.

Figure 7:
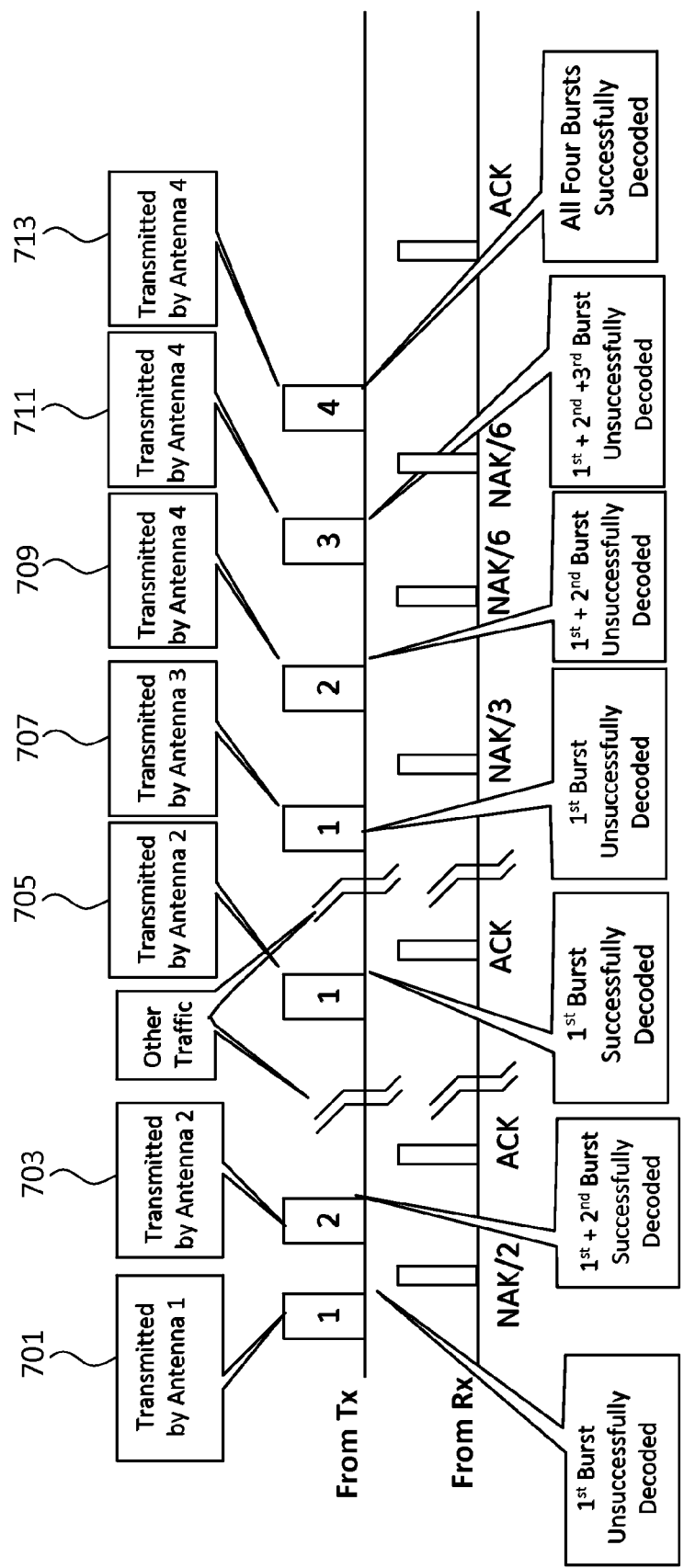
FIG. 7 illustrates an exemplary MNT-TAS transmission scenario.

FIG. 7 illustrates an exemplary MNT-TAS transmission scenario. It can be assumed that the antenna used for the first packet transmitted in each scenario was randomly selected. It depends, of course, on the traffic immediately preceding the transmission. At 701, a first burst is transmitted by antenna subset 1, which is unsuccessfully decoded and results in a NAK/2 ($\gamma_i = 2$). In this case $L_1 < L_2$ so the next antenna subset (2) is randomly selected and retransmits the burst at 603. The burst is successfully decoded and results in an ACK. The second scenario in FIG. 7 is a transmission by antenna subset 2 at 505, which is successfully decoded and results in an ACK. The third scenario begins at 707 with a transmission by subset 3. The receiver returns a NAK/3 ($\gamma_i = 3$). In this case, after evaluation, the transmitter determines that $L_1 > L_2$, and so the best antenna subset (antenna subset 4) associated with $L_1$ is selected for the next retransmission of the frame in 709. So antenna subset 4 transmits in 709 and a NACK/6 is received. Again, the transmitter determines that $L_1 > L_2$, and so the best antenna subset (antenna subset 4) is again selected for the next retransmission of the frame in 711. However, that transmission is also unsuccessfully decoded resulting in a NAK/6. Again the transmitter determines that $L_1 > L_2$ and so the best antenna subset (antenna subset 4) is again selected for the next retransmission of the frame in 713, which results in an ACK. Note that the transmission scenario is similar to that shown in FIG. 5 showing T-TAS, but the determination by the feedback processor (see FIG. 1) as to which antenna subset to use is based on different criteria in accordance with the MNT-TAS protocol.

In one MNT-TAS embodiment, if L1>L2, then the subset of antennas associated with the best subset is used for all subsequent retransmissions until an ACK is received. That may be useful when the channel is substantially static.

Having described three protocols, R-TAS, T-TAS and MNT-TAS, Table 1 summarizes the differences between the three protocols from the perspective of implementation complexity, the feedback information required and transmitter requirements.

TABLE 1

| Protocol | Complexity | Feedback info | TX needs |
|---|---|---|---|
| R-TAS | low | ARQ | nothing |
| T-TAS | moderate | ARQ/CQI | threshold level |
| MNT-TAS | high | ARQ/CQI | distribution of Ch quality |

Based on simulation results, the MNT-TAS protocol achieves the best performance, while the R-TAS protocol is worst. The T-TAS protocol is between two protocols. This result is intuitively reasonable since the MNT-TAS protocol uses CQI most effectively, while the R-TAS protocol never uses CQI.

Simulation results indicate that an exemplary (4, 2; 1, 1|m) system such as shown in FIG. 1, outperforms other configurations even with those with more than four antennas.

Note that various antenna selection embodiments described herein utilize the feedback processor 105 shown in FIG. 1 to select an antenna subset. The functionality to implement the appropriate antenna subset may be implemented in hardware or software or more typically a combination. Thus, the selection of an antenna subset based on R-TAS, T-TAS, or MNT-TAS, may utilize software running on processor 105. Any such software may be encoded in at least one computer readable medium selected from the set of a disk, tape, or other magnetic, optical, or electronic storage medium.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A method comprising:
   receiving a no acknowledge (NACK) from a receiving device indicating that first information transmitted to the receiving device over a first subset of antennas selected from a set of antennas, was not successfully received;
   storing a history of received channel quality indicators;
   in response to receiving the NACK, selecting a second subset of antennas from the set of antennas to retransmit the first information to the receiving device, the selecting including,
      comparing a best channel quality indicator stored in the history and associated with a best subset of the set of antennas to a threshold channel quality indicator, and
      if the best channel quality indicator is greater than the threshold channel quality indicator then selecting the best subset of the set of antennas as the second subset of antennas, and
      if the best channel quality indicator is less than the threshold channel quality indicator then randomly selecting one of the subset of antennas as the second subset to retransmit the first information; and
   retransmitting the first information to the receiving device over the second subset of antennas.

2. The method as recited in claim 1 wherein each of the channel quality indicators provides an indication of signal to noise ratio.

3. The method as recited in claim 1 wherein each of the channel quality indicators provides a measure of signal to noise ratio improvement in a current transmission over a signal to noise ratio associated with a previous transmission.

4. The method as recited in claim 1 further comprising storing L channel quality indicators in the history, where L is a number of retries required.

5. The method as recited in claim 1 further comprising randomly selecting the first subset.

6. The method as recited in claim 1 further comprising negotiating a particular type of transmit antenna selection protocol with the receiving device prior to transmitting the first information over the first subset of antennas.

7. The method as recited in claim 1 wherein the first subset and the second subset are each at least two antennas.

8. A method comprising:
   receiving a no acknowledge (NACK) from a receiving device indicating that first information transmitted to the receiving device from a first subset of antennas of a set of antennas was not successfully received;
   receiving a channel quality indicator from the receiving device;
   in response to receiving the NACK, comparing an expectation of a number of transmissions between a first and at least a second policy and selecting one of the first and second policies as a better policy, the better policy being evaluated according to which policy has an expected fewer number of transmissions;
   determining the expectation of the number of transmissions as a function of a current maximum channel quality indicator and a remaining amount of channel quality; and
   selecting a second subset of the antennas associated with the better policy for retransmission of the first information.

9. The method as recited in claim 8 further comprising randomly selecting the first subset of antennas.

10. The method as recited in claim 8 further comprising negotiating a particular type of transmit antenna selection protocol with the receiving device prior to transmitting the first information over the first subset of antennas.

11. The method as recited in claim 8 wherein the first policy is a best known antenna subset and the second policy is a randomly selected subset.

12. The method as recited in claim 11 further comprising if the best known antenna subset is the better policy, using the best known antenna subset for all subsequent retransmissions for the first information.

13. The method as recited in claim 8 wherein the remaining amount of channel quality is a difference between a channel quality threshold and an accumulated channel quality.

14. A transmitting station comprising:
   a set of antennas having a plurality of selectable subsets of antennas, each subset including at least two antennas;
   control logic to select a first subset of the set of antennas to transmit first information to a receiving device, the control logic including a processor and memory storing software executable on the processor;
   storage locations for storing a channel quality history of received channel quality indicators from the receiving device;
   wherein the control logic is, responsive to receiving a no acknowledge (NAK) from the receiving device indicating the first information was not successfully received, to select a second subset from the set of antennas to retransmit the first information to the receiving device;
   wherein the control logic is configured to determine a best channel quality indicator in the channel quality history and to compare a threshold channel quality indicator to the best channel quality indicator, the best channel quality indicator associated with a best subset of the set of antennas; and wherein the control logic is configured, responsive to the NAK and the best channel quality indicator being greater than the threshold channel quality indicator, to select the best subset of the set of antennas as the second subset of antennas; and wherein the control logic is configured, responsive to the NAK and the best channel quality indicator being less than the threshold channel quality indicator to randomly select one of the selectable subsets as the second subset.

15. The transmitting station as recited in claim 14 wherein the transmitting station includes a space-time block coder to transmit the first information using a space-time block code.

16. The transmitting station as recited in claim 14 wherein the storage locations for the channel quality indicators provide storage for L channel quality indicators in the history, where L is a maximum number of retransmissions allowed.

17. The transmitting station as recited in claim 14 wherein each of the channel quality indicators provide an indication of signal to noise ratio.

18. The transmitting station as recited in claim 14 wherein each of the channel quality indicators provide a measure of signal to noise ratio improvement in a current transmission over a signal to noise ratio associated with a previous transmission.

* * * * *